United States Patent [19]
Kritzler et al.

[11] Patent Number: 5,752,346
[45] Date of Patent: May 19, 1998

[54] MOTOR-VEHICLE DOOR

[75] Inventors: Dietmar Kritzler, Lüdenscheid; Michael Strathmann, Velbert, both of Germany

[73] Assignee: Kiekert AG, Heiligenhaus, Germany

[21] Appl. No.: 625,514

[22] Filed: Mar. 26, 1996

[30] Foreign Application Priority Data

Mar. 28, 1995 [DE] Germany ............... 195 11 294.6
Apr. 29, 1995 [DE] Germany ............... 295 07 235.0

[51] Int. Cl.$^6$ ........................................... B60J 5/04
[52] U.S. Cl. ........................................ 49/503; 49/502
[58] Field of Search ................... 49/503, 394, 502; 296/146.1

[56] References Cited

U.S. PATENT DOCUMENTS

| | | | |
|---|---|---|---|
| 4,603,894 | 8/1986 | Osenkowski | 296/146.1 X |
| 4,827,671 | 5/1989 | Herringshaw et al. | 49/503 |
| 4,831,710 | 5/1989 | Katoh et al. | 49/502 X |
| 5,226,259 | 7/1993 | Yamagata | 49/502 |

FOREIGN PATENT DOCUMENTS 400 505   5/1990   European Pat. Off.

*Primary Examiner*—Philip C. Kannan
*Attorney, Agent, or Firm*—Herbert Dubno; Andrew Wilford

[57] ABSTRACT

A motor-vehicle door has generally upright inside and outside panels, a window frame above the panels, a track extending vertically between the panels into the frame, and a window glass vertically displaceable in the track between the panels. A latch assembly has a holder, an outside door handle in the holder, a door latch on an edge of the door between the panels, a connecting housing between the panels and having a U-section lower part fixed to the door latch and an upper part fixed to and carrying the holder for the outside handle with the handle on the outside door panel, and a link rod extending between the outside door handle and the door latch and laterally enclosed by the U-section lower part.

8 Claims, 5 Drawing Sheets

5,752,346

1

MOTOR-VEHICLE DOOR

FIELD OF THE INVENTION

The present invention relates to a motor-vehicle door. More particularly this invention concerns a subassembly mountable in the door and including the latch, outside door handle, and outside door lock.

BACKGROUND OF THE INVENTION

A standard motor-vehicle door has spaced inside and outside panels defining a cavity and joined at a door edge. The door also has above the panels a window frame and a track between the panels allows a window pane to slide between an up position in the frame and a down position between the panels leaving the frame open. A latch is mounted on the door edge to coact with a keeper bolt on a door post. An inside handle and lock element are mounted on the inside panel and serve to actuate the latch and lock or unlock it, and similarly an outside handle and lock, typically a key-operated cylinder, are provided on the outside panel for similar purposes.

Normally during manufacture of the vehicle the latch is mounted on the door edge and the inside and outside handles and lock elements are mounted in place and connected up to the latch. These connections must be routed so that they not interfere with the window which, when down, effectively subdivides the door cavity into an inside and an outside compartment. Clearly this type of assembly is complex to make. When tolerances are off on some parts it is a fairly difficult task to get the latch working correctly, a job entailing careful adjustments on the various interconnecting links.

Accordingly European 0,400,505 of DiGiusto describes an arrangement that houses the outside door handle, outside door lock, and latch all together so that they can be installed as a single assembly in to the vehicle door. This entire assembly is mounted wholly out of the path of the window glass. It provides no particular protection against break-in.

OBJECTS OF THE INVENTION

It is therefore an object of the present invention to provide an improved motor-vehicle door.

Another object is the provision of such an improved motor-vehicle door which overcomes the above-given disadvantages, that is which is very simple to assemble and that offers improved break-in protection.

SUMMARY OF THE INVENTION

A motor-vehicle door has according to the invention generally upright inside and outside panels, a window frame above the panels, a track extending vertically between the panels into the frame, and a window glass vertically displaceable in the track between the panels. A latch assembly has a holder, an outside door handle in the holder, a door latch on an edge of the door between the panels, a connecting housing between the panels and having a U-section lower part fixed to the door latch and an upper part fixed to and carrying the holder for the outside handle with the handle on the outside door panel, and a link rod extending between the outside door handle and the door latch and laterally enclosed by the U-section lower part.

The latch assembly forms a separate element with all of its parts solidly interconnected so it can be installed as one piece in the door. The U-section protection for the link rod makes unauthorized opening of the door, typically with a

2 slim bar pushed down past the window seal, impossible. The invention is based on the recognition that a particularly constructed latch assembly not only makes it easier to manufacture the door, but also can increase its resistance to break-in.

According to a further feature of the invention a door lock is provided on the outside panel and another link rod extending between the lock and the door latch is also laterally enclosed by the U-section lower part. Normally the inside door-locking element is disconnected when the door is locked, so no protection is necessary for its link rod.

According to the invention the latch and lower part have interengaging formations that are fixed together. The U-section lower part is deformable, for instance being made of an elastically deformable synthetic resin. The upper part has a bent over end to which the holder is fixed.

According to another feature of the invention the outer panel is formed with a hole. The door further has according to the invention a door lock on the outside panel having an inwardly directed rotatable pin. The upper part is formed with a seat complementarily receiving the pin, and another link rod extending between the lock and the door latch and laterally enclosed by the U-section lower part. The inner panel is formed with a cutout through which the assembly can fit for mounting inside the door between the panels.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
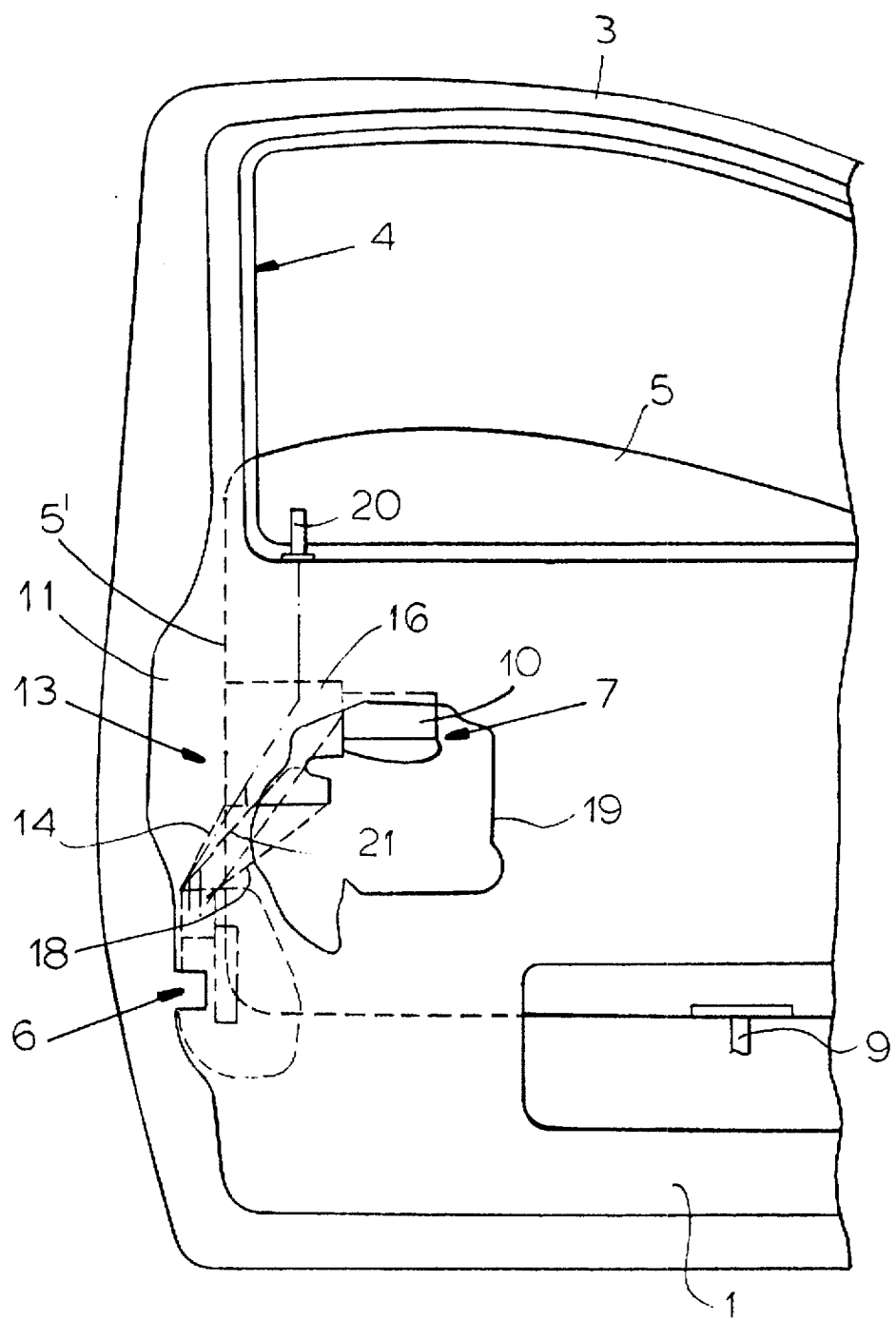
FIG. 1 is a small-scale partial view of the inside of the door according to the invention.
Figure 2:
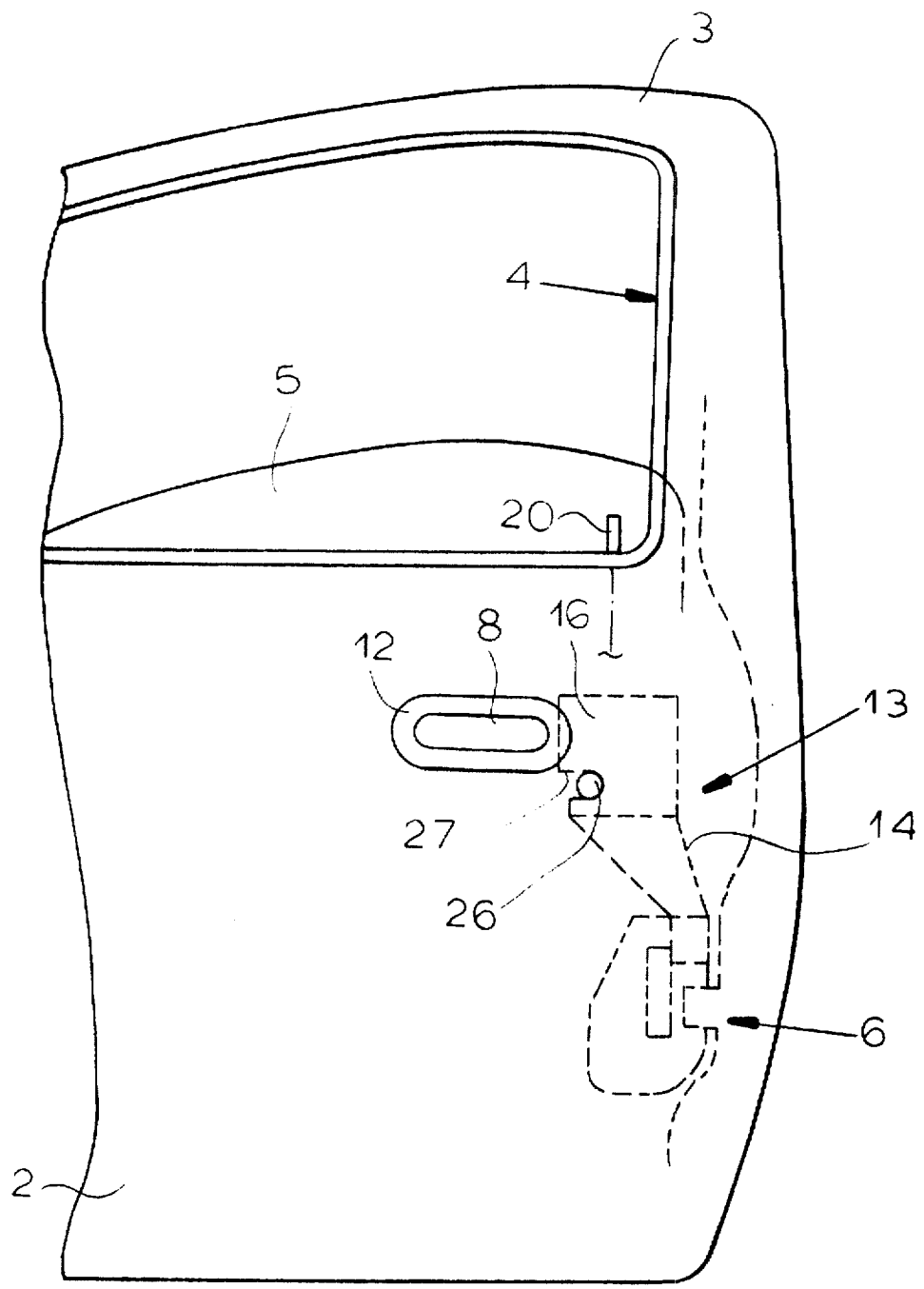
FIG. 2 is a view like FIG. 1 but of the outside of the door.
Figure 5:
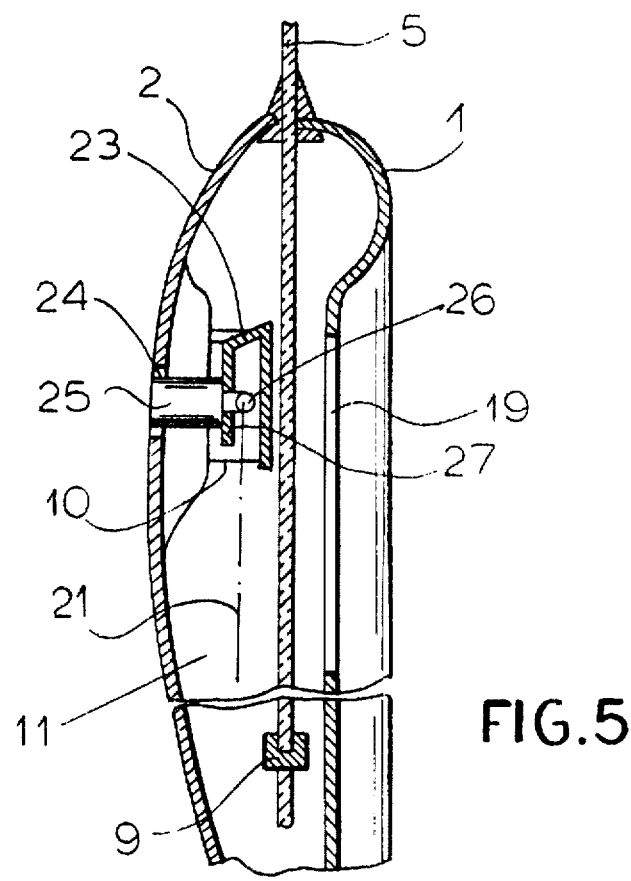
FIG. 5 is small-scale vertical section taken along line V—V of FIG. 3.

As seen in FIGS. 1, 2, and 5 a motor-vehicle door according to the invention has a generally vertical inside panel 1 and a parallel outside panel 2 joined at a door edge 11. The door defines a window frame 3 having a track 4 for a window glass or pane 5 that is moved vertically by hardware including a pusher bar 9 on the lower edge of the pane 5. The inside panel 1 is cut out at 19 to allow access, before a decorative cover panel is installed, to the inside of the door.

Figure 3:
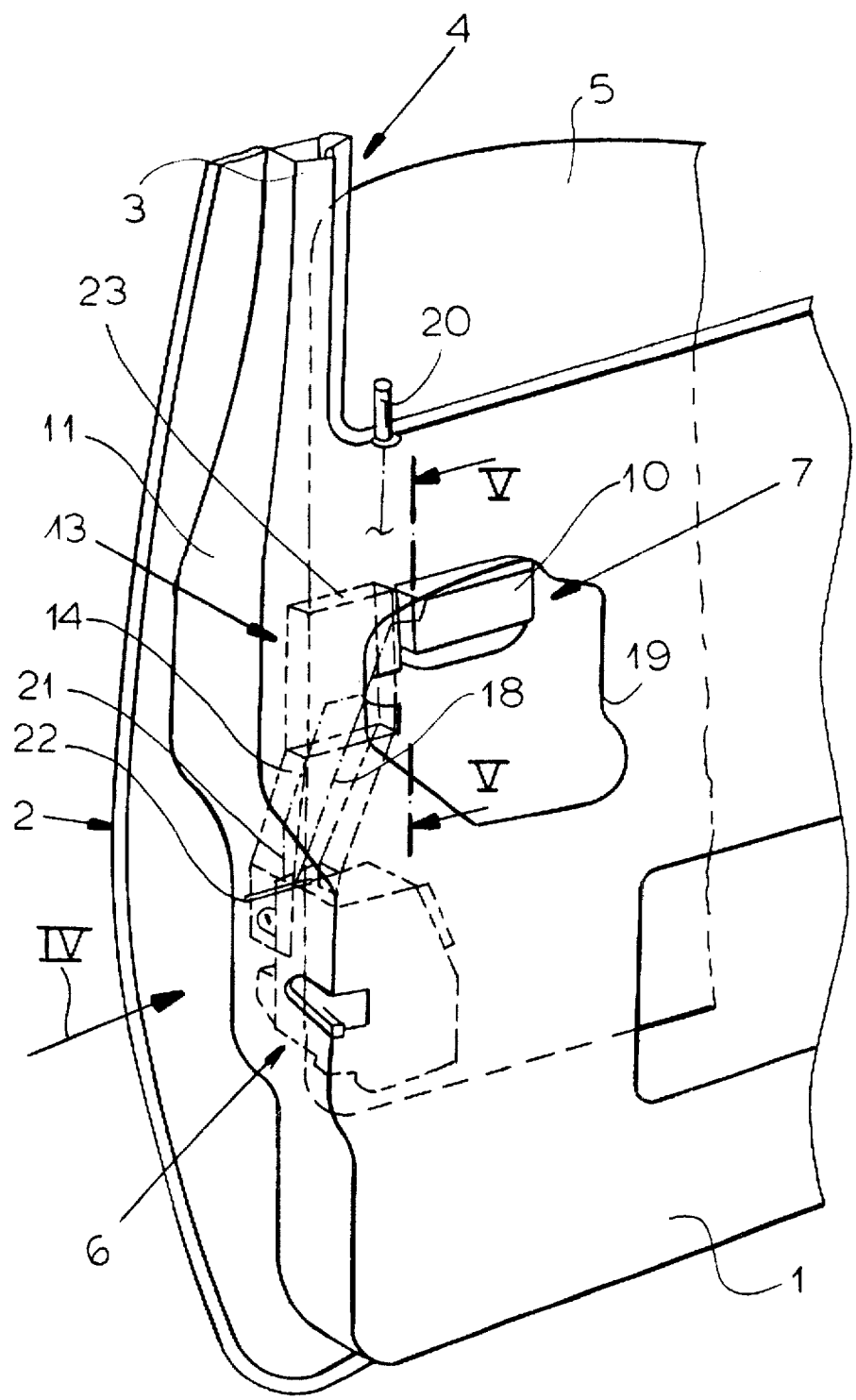
FIG. 3 is a larger-scale perspective detail view of the door from the inside.
Figures 4, 6:
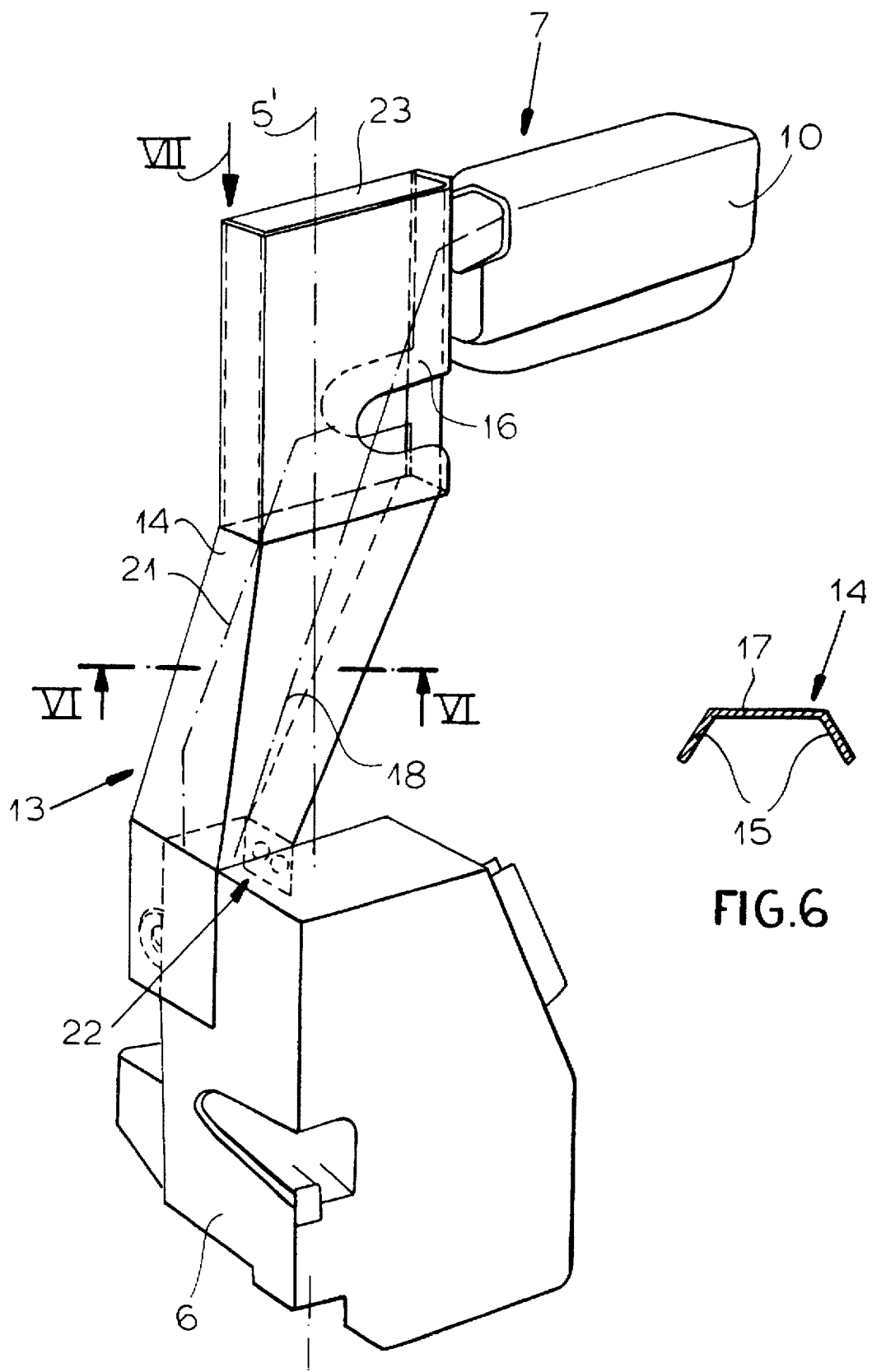
FIG. 4 is a larger-scale perspective view of the latch assembly taken in the direction of arrow IV of FIG. 3.
FIG. 6 is a section taken along line VI—VI of FIG. 4.

As shown in more detail in FIGS. 3 and 4 a latch assembly 7 basically comprises a door latch 6 fixed to the door edge 11, an outside actuation subassembly 7, a lock cylinder 25, and a connecting housing 13. A further inside handle is provided but is not illustrated here. The outside actuation subassembly 7 comprises a holder 10 for an outside door handle 8 that normally is surrounded by a trim piece 12. The lock 25 is set in a hole 24 in the outside wall 2 offset from the handle 8. An inside actuation button 20 is provided and the latch 6 is of the type that, when locked, disconnects this button 20 so it can be shifted without affecting the latch 6.

The connecting housing 13 has a lower part 14 secured at 22 to the latch and an upper part 16 to which the holder 10 is fixed. In addition this upper part 16 is formed with a cutout 27 into which a pin 26 at the inside end of the cylinder 25 is received. An upper wall 23 of the upper part 16 extends outward and down to upwardly shield these parts. The lower part 14 as shown in FIG. 6 is basically U-shaped, having a flat inner wall or base 17 and a pair of flanges 15. The handle 8 has a link rod 18 coupling it to the latch 6 and the lock 25 has a link rod 21 similarly coupled to the latch 6. Both these link rods 18 and 21 extend in and are laterally shielded by the U-section lower part 14.

Figure 7:
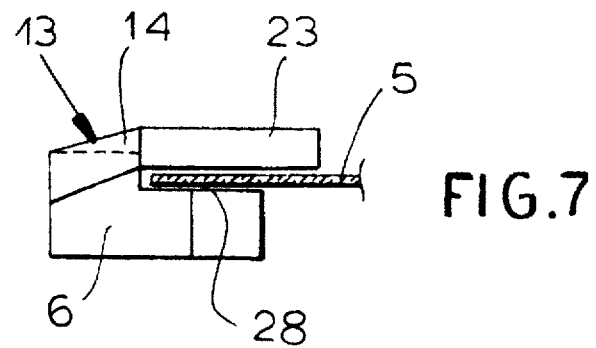
FIG. 7 is a top view taken in the direction of arrow VII of FIG. 4.

The entire assembly 7 can easily be installed through the cutout 19 in the door when the glass 5 is in the up position. When dropped down a rear edge 5' of the glass 5 will move downward in a gap 28 (FIG. 7) between the lower part 14 and the latch 6. Since the entire assembly is basically one rigid unit, the connections of the outside handle 8 and the lock 25 can be counted on to work perfectly, without any last-minute adjustments on the door.

We claim:

1. A motor-vehicle door comprising:

generally upright inside and outside panels;

a window frame above the panels;

a track extending vertically between the panels into the frame;

a window glass vertically displaceable in the track between the panels; and a latch assembly having a holder, an outside door handle in the holder, a door latch on an edge of the door between the panels, a connecting housing between the panels and having a U-section lower part fixed to the door latch and an upper part fixed to and carrying the holder for the outside handle with the handle on the outside door panel, and a link rod extending between the outside door handle and the door latch and laterally enclosed by the U-section lower part.

2. The motor-vehicle door defined in claim 1, further comprising:

a door lock on the outside panel; and another link rod extending between the lock and the door latch and laterally enclosed by the U-section lower part.

3. The motor-vehicle door defined in claim 1 wherein the latch and lower part have interengaging formations that are fixed together.

4. The motor-vehicle door defined in claim 1 wherein the U-section lower part is deformable.

5. The motor-vehicle door defined in claim 4 wherein the lower part is made of an elastically deformable synthetic resin.

6. The motor-vehicle door defined in claim 1 wherein the upper part has a bent over end to which the holder is fixed.

7. The motor-vehicle door defined in claim 1 wherein the outer panel is formed with a hole, the door further comprising:

a door lock on the outside panel having an inwardly directed rotatable pin, the upper part being formed with a seat complementarily receiving the pin; and another link rod extending between the lock and the door latch and laterally enclosed by the U-section lower part.

8. The motor-vehicle door defined in claim 1 wherein the inner panel is formed with a cutout through which the assembly can fit for mounting inside the door between the panels.

* * * * *